Sept. 30, 1947.　　A. L. PARKER　　2,428,176
COUPLING FOR TUBES HAVING MEANS FOR DAMPENING VIBRATIONS THEREIN
Filed May 18, 1944

Inventor
Arthur L. Parker
By Mason, Porter & Diller
Attorneys

Patented Sept. 30, 1947

2,428,176

UNITED STATES PATENT OFFICE 2,428,176

COUPLING FOR TUBES HAVING MEANS FOR DAMPENING VIBRATIONS THEREIN

Arthur L. Parker, Cleveland, Ohio, assignor to The Parker Appliance Company, Cleveland, Ohio, a corporation of Ohio Application May 18, 1944, Serial No. 536,176

4 Claims. (Cl. 285—86)

1

The invention relates to new and useful improvements in a coupling for tubes and more particularly to a coupling having means for dampening vibrations imparted to the tube.

An object of the invention is to provide a coupling of the above type wherein the vibration dampening means completely encircles the tube and yieldingly contacts therewith for assuring uniform resistance to flexing in any direction.

A further object of the invention is to provide a coupling of the above type wherein the dampening means spirally encircles the tube and yieldingly contacts therewith for assuring uniform resistance to flexing in any direction.

A further object of the invention is to provide a coupling of the above type having a sleeve disposed within the coupling for engaging and rigidly securing the tube coupling which sleeve is provided with yielding means extending outwardly beyond the nut, completely encircling the tube and contacting therewith for assuring substantially uniform resistance to the flexing of the tube in any direction.

A further object of the invention is to provide a coupling of the above type wherein the yielding means is formed integral with the sleeve and extends spirally about the tube.

These and other objects will in part be obvious and will in part be hereinafter more fully disclosed.

In the drawings—

Figure 1:
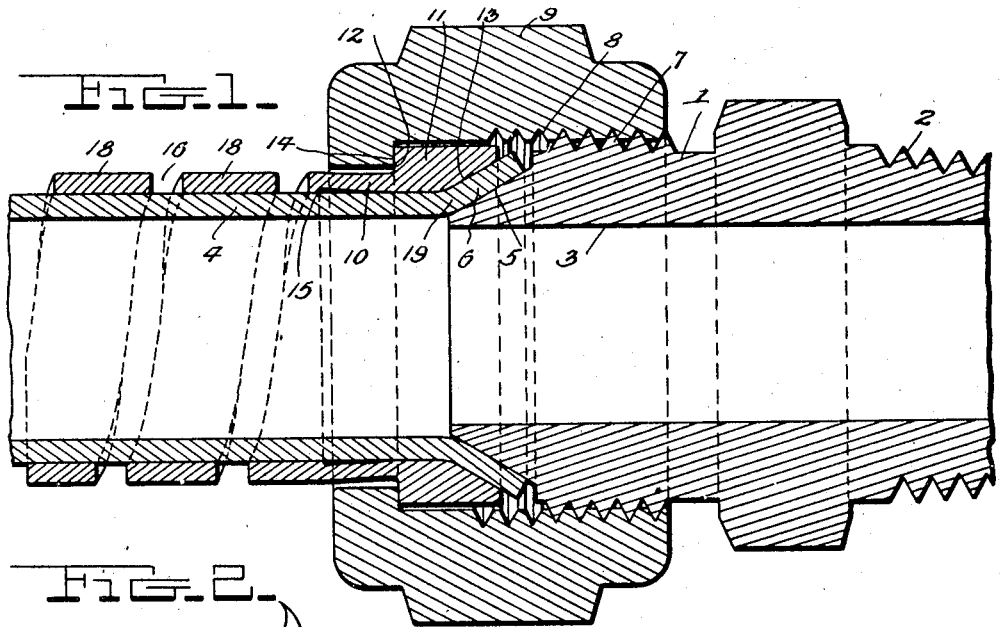
Figure 1 is a longitudinal sectional view through a coupling with the tube attached thereto, which coupling embodies the improvements.

The coupling, as shown in Figure 1, includes a body member 1 having a threaded portion 2 adapted to be connected to any suitable means. This body member is provided with a bore 3 which is substantially the same as the bore of the tube 4 which is to be clamped to the coupling. The body member 1 is also provided with a tapered portion 5 which is adapted to receive the flared end 6 of the tube 4. The body member also has a thread 7 adapted to receive the thread 8 on the nut 9. As shown in this Figure 1, the tube is clamped against the seat 5 by a sleeve 10 which

2 has a solid head 11 provided with a shoulder 12. This solid head 11 also has a tapered portion 13 which engages the outer face of the flared end of the tube for clamping the same against the seat. The nut 9 is provided with a shoulder 14 which is adapted to engage the shoulder 12 on the sleeve and force the sleeve against the flared end of the tube and the tube in turn against the seat on the body member. Thus the tube is rigidly and firmly clamped to the coupling.

The sleeve 10 in the region of the head 11 and extending outwardly therefrom for a short distance, is of the diameter X (see Figure 2) which is the same as the outer diameter of the tube which is to be clamped by the sleeve, or substantially so. The remainder of the sleeve is of less diameter than the tube and has been indicated by X—. This forms a shoulder 15 where the two diameters meet. The sleeve is provided with a relatively wide spiral slot 16 which extends from a point 17 slightly within the shoulder 15 of the outer end of the sleeve. This forms the sleeve into an extension spirally encircling the tube, which spiral extension is indicated at 18. This spiral extension encircles the tube completely and as shown, it encircles the tube substantially twice. The spiral extension 18 will expand slightly when forced onto the tube as it is of smaller diameter than the outer diameter of the tube. The slot runs only a part revolution beyond the shoulder 15 and therefore the sleeve in the region of the shoulder 15 is press-fitted onto the tube. In view of the fact that the spiral extension of the sleeve completely encircles the tube and snugly engages the tube, said extension will ensure substantially uniform resistance to the flexing of the tube in any direction and the vibration strains imposed upon the tube become ineffective to cause breakage of the tube in the strain-hardened section 19. It is understood, of course, that the sleeve is of steel or some similar material which has sufficient flexibility to restrain and dampen vibrations imposed upon the tube.

Figure 2:
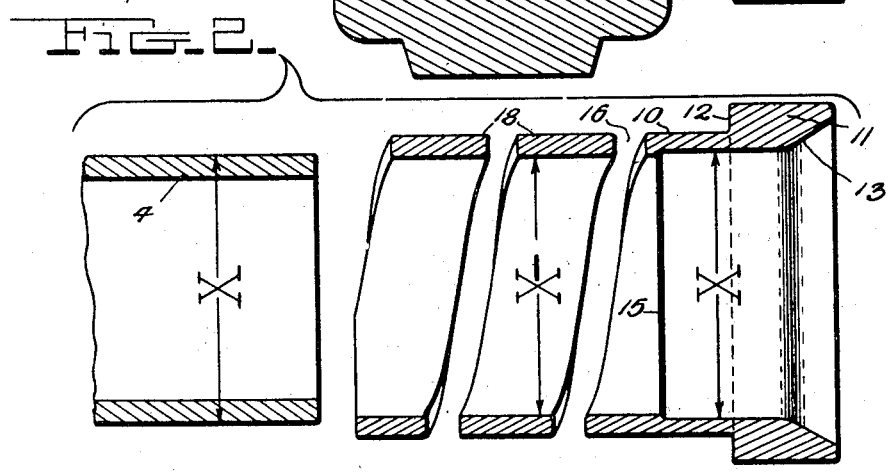
Figure 2 is a view showing the end of the tube and the clamping sleeve associated therewith, both the tube and sleeve being in section.
Figure 3:
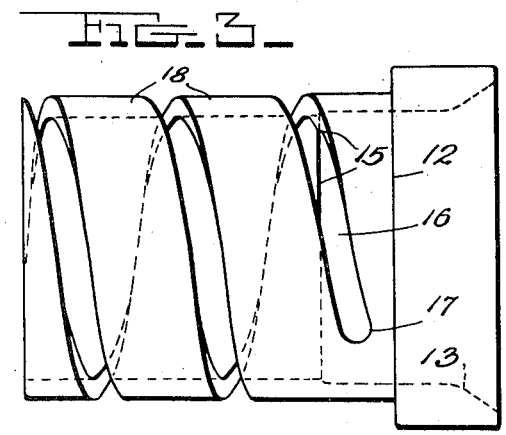
Figure 3 is a side view of the clamping sleeve and yielding means formed as a part thereof for dampening vibrations in the tube.
Figure 4:
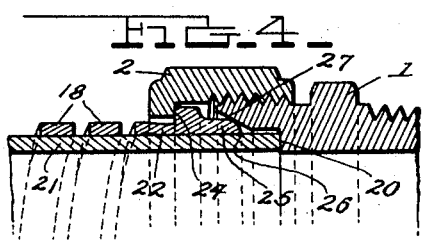
Figure 4 is a view in longitudinal section showing a slightly modified form of sleeve for holding the tube rigidly in the coupling.

In Figure 4 the coupling is similar except for the fact that the clamping portion of the sleeve has been slightly modified. The body portion 1 has a nut 2 threadedly engaged therewith. The body portion is provided with a seat 20 against which the end of the tube 21 is seated. The tube in this instance is of uniform diameter all the way to the end thereof. Surrounding the tube is a sleeve 22 having an extension which is slotted so as to provide a spiral member 18 which snugly engages the tube and resists the vibrations imposed upon the tube. The sleeve is provided with a shoulder 24 which is engaged by a shoulder on the nut. The inner end of the sleeve 25 has a rounded, tapered portion terminating in a relatively sharp edge 26. The body member at the outer entrance to the bore which receives the tube is provided with a cam surface 27. The sleeve is placed on the tube and the tube inserted in the body member against the seat 20. The nut is threaded onto the body member and engages the shoulder 24 of the sleeve and forces the tapered end thereof against the cam surface 27 which will contract the extreme inner end of the sleeve and cause it to bite into the tube and thus press the tube against the seat on the body member. This firmly clamps the tube to the coupling. The portion of the sleeve within the nut is dimensioned so that it is of substantially the same inner diameter as the outer diameter of the tube. A portion of the sleeve extending outside of the nut is of slightly less diameter, as described in connection with the sleeve as shown in Figure 2. The sleeve makes a press-fit with the tube and the spiral section of the sleeve completely encircles the tube and will firmly grip the same and thus offer a substantially uniform resistance to the flexing of the tube in any direction.

While the sleeve has been described in one instance as provided with a head adapted to contact with the flared end of the tube for holding it in the coupling and in another instance with a tapered end which is contracted so as to bite into the tube for holding it in the coupling, it is understood that these are illustrated solely for the purpose of showing well known ways of securing the tube to the coupling through the clamping action of a sleeve. It will be understood that other ways may be utilized for clamping the tube to the coupling. The essential feature of the invention resides in the construction of the sleeve portion which encircles the tube outside of the nut and which yieldingly contacts with the tube so as to ensure substantially uniform resistance to the flexing of the tube in any direction. It will also be understood that this portion of the tube which restrains the vibrations imposed upon the tube may be changed as to details of construction without departing from the spirit of the invention as set forth in the appended claims.

I claim:

1. A coupling for tubes comprising a body member, a nut having threaded connection with said body member, a sleeve within the nut having means for engaging and rigidly securing the tube to the coupling, said sleeve having an extension spirally encircling the tube outwardly from the nut and yieldingly contacting therewith for assuring substantially uniform resistance to the flexing of the tube in any direction.

2. A coupling for tubes comprising a body member, a nut having threaded connection with said body member, a sleeve within the nut having means for engaging and rigidly securing the tube to the coupling, said sleeve having the portion thereof within the nut of substantially the same inner diameter as the outer diameter of the tube and the portion thereof extending outwardly from the nut of a slightly less diameter than the outer diameter of the tube, said portion of the sleeve extending beyond the nut having a spiral slot formed therein extending all the way to the outer end of the sleeve and forming means encircling the tube and yieldingly contacting therewith for assuring substantially uniform resistance to the flexing of the tube in any direction.

3. A coupling for tubes comprising a body member, a nut having threaded connection with said body member, said coupling having means therein for engaging and rigidly securing the tube to the coupling and having a spiral extension encircling the tube and yieldingly contacting therewith for assuring substantially uniform resistance to the flexing of the tube in any direction.

4. A sleeve for tube couplings, comprising a body portion adapted to engage and rigidly secure a tube to the coupling when the coupling is tightened, and a spiral extension extending outwardly from said body portion adapted to encircle the tube and yieldingly contact therewith to assure substantially uniform resistance to the flexing of the tube in any direction.

ARTHUR L. PARKER.

REFERENCES CITED

The following references are of record in the file of this patent:

UNITED STATES PATENTS

| Number | Name | Date |
| --- | --- | --- |
| 2,351,362 | Parker | June 13, 1944 |
| 2,131,316 | Ellis | Sept. 27, 1938 |
| 1,367,246 | Ewald | Feb. 1, 1921 |